United States Patent [19]
Johnson

[11] Patent Number: 4,653,599
[45] Date of Patent: Mar. 31, 1987

[54] LOAD CELLS WITH OVERLOAD PROTECTION AND MOMENT ADJUSTMENT MEANS

[76] Inventor: Michael K. Johnson, 1230 Monterey Blvd., San Francisco, Calif. 94127

[21] Appl. No.: 742,566

[22] Filed: Jun. 7, 1985

[51] Int. Cl.⁴ .................. G01G 3/14; G01G 23/02; G01G 3/08; G01L 1/22; G01L 25/00
[52] U.S. Cl. .................................. 177/211; 177/156; 177/229; 73/1 B; 73/862.65
[58] Field of Search ............... 177/154, 156, 211, 229; 73/1 B, 862.65

[56] References Cited

U.S. PATENT DOCUMENTS

| | | | |
|---|---|---|---|
| 4,338,825 | 7/1982 | Amlani et al. | 73/862.65 |
| 4,485,881 | 12/1984 | Tramposch et al. | 177/229 X |
| 4,515,232 | 5/1985 | Rubinstein | 177/154 |
| 4,561,512 | 12/1985 | Tramposch | 177/229 |
| 4,606,421 | 8/1986 | Schroeder | 177/229 X |

Primary Examiner—George H. Miller, Jr.
Attorney, Agent, or Firm—Phillips, Moore, Lempio & Finley

[57] ABSTRACT

A load cell includes base and load receiving members connected together by a pair of parallel flexures to form a parallelogram configuration. One of the flexures has at least one strain gage secured thereon, along with a cantilevered stop member positioned between the base and load receiving members. The stop member is suspended between the ends of a pair of adjustable set screws threadably mounted in the base and load receiving members to provide for an overload and underload protection of the load cell. Additional adjustable set screws are strategically placed in the load cell to further provide for the selective adjustment and redistribution of stresses sensed by the strain gage whereby the same electrical signal will be produced independent of the location of a load along a longitudinal axis of the load cell or a second axis perpendicular thereto. Thus, the load cell cannot be overstressed and can be adjusted to provide the same weight readout regardless of the position of the load on a platter secured on the load receiving member.

16 Claims, 5 Drawing Figures

LOAD CELLS WITH OVERLOAD PROTECTION AND MOMENT ADJUSTMENT MEANS

TECHNICAL FIELD

This invention relates to a load cell and more particularly to a load cell adapted for use in weighing apparatus or the like.

BACKGROUND ART

A conventional load cell of the parallel beam type is generally formed from an unitary block of aluminum, machined to provide a pair of parallel flexures and an intermediate sensing beam secured within the block. A strain gage is secured on the sensing beam to produce an electrical signal responsive to the magnitude of load imposed on a platter secured on one end of the load cell. Another conventional type of load cell eliminates the sensing beam entirely and secures the strain gage on one of the flexures.

One problem encountered with conventional load cells of the above type is that they are designed without overload or underload protection. Overloading of the load cell, for example, can result in permanent deformation of the flexures and sensing beams resulting in its loss of structural integrity and usability. Thus, the load cell must be discarded and replaced by a new one.

A further problem encountered with conventional load cells is that moment adjustment for offset loading is solely accomplished by machining critical areas of the load cell in the area of its flexures. Over-machining, causing removal of too much load cell material at such critical areas, will also result in a load cell that is rendered unusable and that must be discarded. The term "moment adjustment" offset loading adjustment relates to the calibration of the load cell to achieve the same weight readout of the load independent of its position on the platter.

DISCLOSURE OF INVENTION

An object of this invention is to overcome the above, briefly described prior art problems by providing an economical and highly accurate load cell, particularly adapted for use in weighing apparatus and the like adapted to provide overload and/or underload protection and/or full moment adjustment.

The load cell essentially comprises a base member adapted for securance to a stationary base, a load receding member adapted to have a load imposed thereon, flexure means secured between the base and load receiving members for flexing in response to the load and sensing means for producing a variable electrical signal in response to the magnitude of the load.

In one aspect of this invention, the load cell is further provided with overload and/or underload protection means for delimiting flexing of the flexure means and load receiving member when a load imposed on the load receiving member exceeds a predetermined maximum.

In another aspect of this invention, the load cell comprises adjustment means for selectively redistributing the stresses sensed by the sensing means to provide at least substantially the same electrical signal therefrom independent of the location of the load along the longitudinal axis of the load cell and/or a second axis perpendicular thereto. This so-called moment adjustment capability will thus enable the load cell to accurately weigh a load irrespective of its position on a platter secured to the load cell.

BRIEF DESCRIPTION OF THE DRAWING

Other objects and advantages of this invention will become apparent from the following description and accompanying drawing wherein.

BEST MODE OF CARRYING OUT THE INVENTION

Figure 2:
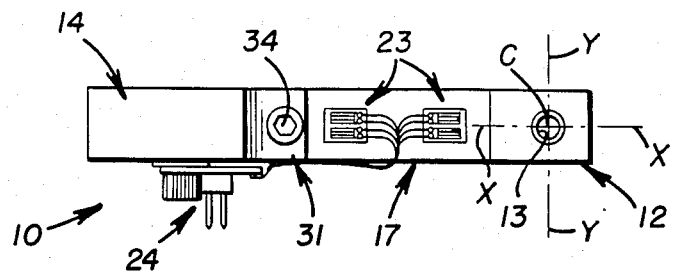
FIG. 2 is a top plan view of the load cell, taken in the direction of arrows II—II in FIG. 1.

FIGS. 1-4 illustrate a load cell 10 particularly adapted for use in a weighing apparatus or scale. In particular, a weighing platter 11 is adapted to be secured on a load receiving member 12 of the load cell by means of a screw (not shown) threadably mounted in a tapped machine screw hole 13. (FIG. 2). Alternatively, the platter could be secured on a side of the load cell, at taped screw holes 13.

A stationary base member 14 of the load cell may be suitably secured to a stationary member of the weighing apparatus at either tapped machine screws holes 15 (FIG. 3), formed on the bottom side of a load cell, or at tapped holes 16 formed on a side of the base member. Although the load cell is particularly adapted for use in weighing apparatus of this kind, it should be understood that it can be utilized in other transducer and load cell applications wherein other types of forces or loads imposed on load receiving member 12 must be closely monitored.

Load cell 10 further includes first and second flexures 17 and 18, respectively, spaced apart in parallel relationshp relative to each other and secured between the base and load receiving members to form a parallelogram and configuration therewith. In the illustrated preferred embodiment of this invention, flexure 17 includes conventional arcuate machined-out flexure connections 19 and 20 whereas flexure 18 includes similarly formed flexure connections 21 and 22. The main body of the load cell is preferably formed from a unitary block of material, such as a suitably composed aluminum-based alloy. In the illustrated embodiment of this invention, flexure connections 19 and 21 are disposed in vertical alignment relative to each other as are flexure connections 20 and 22 (FIG. 1).

Figure 1:
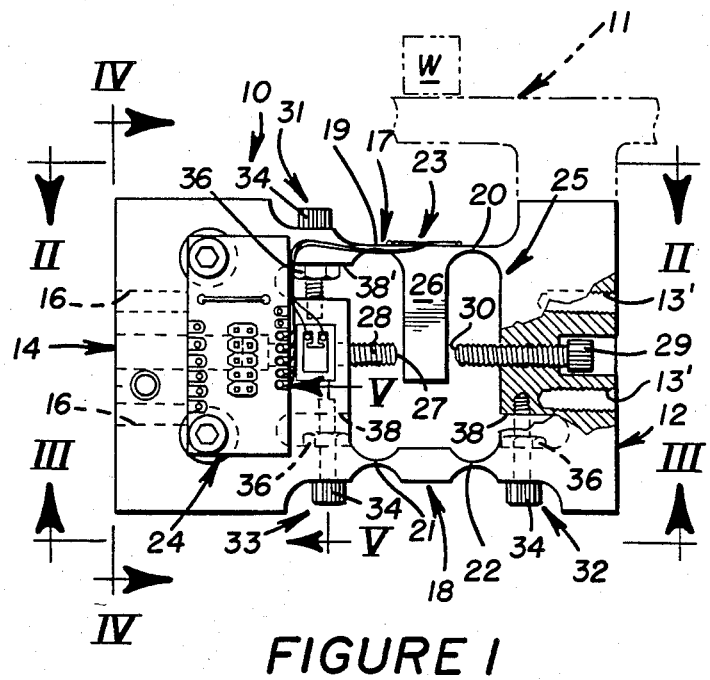
FIG. 1 is a side elevational view of a load cell embodying this invention.
Figure 5:
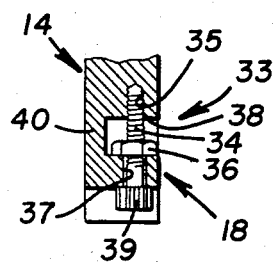
FIG. 5 is a partial sectional view through the load cell, taken in the direction of arrows V—V in FIG. 1.
Figure 3:
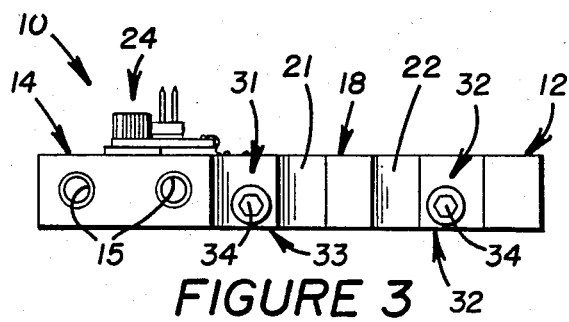
FIG. 3 is a bottom plan view of the load cell, taken in the direction of arrows III—III in FIG. 1.

It can be seen in FIG. 1 that the placing of a weight W on partially illustrated platter 11 will permit load receiving member 12 to flex downwardly relative to stationary base member 14 to create stresses in flexure 17 proportionate to the magnitude of such load. Sensing means in the form of a a pair of strain gages are secured on flexure 17 to produce an electrical signal in response to the stresses sensed thereby, resulting from the magnitude of load imposed on the platter by weight W. The variable electrical output signal from the strain gages is transmitted to a conventional Wheatstone Bridge circuit and attendant circuits 24 which are, in turn, connected to appropriate instrumentation (not shown) which converts the output voltage to a signal that is read-out on standard instrumentation in terms of a weight measurement in a conventional manner. Alternatively, a standard semi-conductor chip could be utilized in lieu of the strain gages 23.

One novel aspect of this invention is a provision of load protection means 25 for delimiting flexing of a load receiving member 12 and flexures 17 and 18 in a first or downward direction in FIG. 1 when the load imposed on the load receiving member exceeds a predetermined magnitude (overload protection). In the embodiment illustrated, the load protection means comprises a cantilevered stop member 26 secure intermediate the ends of flexure 17 and between flexure connections 19 and 20 thereof. The stop member is disposed laterally between load receiving and base members 12 and 14 and is adapted to engage an end 27 of a set screw 28 of the load protection means when the load imposed on the load receiving member exceeds a predetermined maximum.

Figure 4:
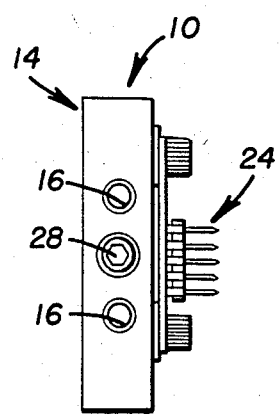
FIG. 4 is an end elevational view of the load cell, taken in the direction of arrows IV—IV in FIG. 1.

As shown in FIGS. 1 and 4, set screw 28 will thus provide stop means for engaging stop member 26 to "lock up" and prevent further flexing of the load receiving member and flexures 17 and 18 to prevent overstressing thereof and possible physical damage to the load cell. For example, for a two pound load cell, set screw 28 can be adjusted to set a predetermined fixed clearance between end 27 thereof and stop member 26 to provide the load cell with a 150% maximum load capacity, i.e., the placement of three or more pounds of weight W on platter 11 will function to engage the stop member with the set screw to prevent further stressing thereof.

In addition, load protection means 25 also preferably includes underload protection means for delimiting flexing of load receiving member 12 in a second or upward direction in FIG. 1 when an upward load imposed on platter 11 exceeds a predetermined maximum. For example, a pulling up on platter 11 will move the load receiving member in an upward direction and if not stopped will unduly stress and possibly damage the load cell. To prevent this possibility, the load protection means preferably comprises a second set screw 29 threadably mounted in load receiving member 12 to have an end 30 thereof positioned closely adjacent to stop member 26.

Thus when an upward load, imposed on platter 11 and load receiving member 12, exceeds a predetermined maximum the stop member will engage end 30 of set screw 29 to prevent further movement thereof and possible load cell damage. Set screws 28 and 29 are preferably aligned in the manner illustrated in FIG. 1 and are adapted to be threaded-down into contact with stop member 26 for load cell shipping or storage purposes.

FIGS. 1-3 and 5 illustrate another aspect of this invention namely, moment adjustment means 31, 32 and 33 for selectively redistributing stresses in the load cell to provide at least substantially the same electrical signal from strain gage 23 independent of the location of weight W (FIG. 1) on platter 11. Since the specific constructions of the three adjustment means are substantially identical, only adjustment means 33 will be described in detail with particular reference to FIG. 5.

Adjustment means 30 comprises a set screw 34 having its end threadably mounted in a tapped hole 35 formed in a body portion of base member 14 and a combined stop and jam nut 36 threadably mounted on the set screw. The shank of the set screw extends through an oversized bore 37, formed through flexure 18, and nut 36 is disposed in a cut out 38 formed between the flexure and base member 14. It can be further seen in FIG. 5 that a torquing-down of right-hand set screw 34 will engage a head 39 of the set screw with an outer surface of flexure 18. Thus, the flexure will be pinched or compressed toward the main body portion of base member 14, assuming that nut 36 is either backed-off or held against rotation, and the shank of the set screw will be placed in tension. Once the proper adjustment is made, nut 36 is torqued-down against the inner surface of flexure 18 to thus function as a lock nut.

Conversely, loosening of the set screw to disengage head 39 from the outer side of flexure 18 and a torquing-down of nut 36 on the set screw will spread flexure 18 and slightly widen cutout 38. The shank of the set screw will be placed in compression between the interference fit between the threads of the set screw and threads 35 and nut 36 which bears against the inner surface of flexure 18. As described more fully hereinafter, selective adjustment of only alignment means 31 will function to re-distribute stresses in flexure 17 to provide substantially the same electrical signal from strain gage 23 independent of the location of weight W along a longitudinal axis X—X (FIG. 2) of the load cell. Selective and simultaneous adjustment of adjustment means 32 and 33 will provide a similar redistribution of stresses in flexure 18 to compensate for off-center loading of the weight in the direction of axis Y—Y which is perpendicular to axis X—X in FIG. 2.

When the operator desires to adjust the moment of the weighing apparatus in respect to the positioning of weight W (FIG. 1) along longitudinal axis X—X of the load cell, adjustment means 31 is solely used in the above-described manner. It should be noted in FIG. 2 that the vertical center line of adjustment means 31 is conincident with axis X—X. In addition, it should be noted in FIG. 1 that a cutout 38' corresponding to cutout 38 in FIG. 5 which terminates at a web 40, is formed transversely completely through the load cell.

Calibration of the load cell to provide the substantially same readout on a visual monitor, within manufacturer's specifications, is initiated by selectively adjusting set screw 39 and/or nut 36 of adjustment means 31 to adjust the moment of the load cell along axis X—X. Placing weight W fore or aft on platter 11 will visually indicate to the operator the necessity for adjusting such moment. For example, if the reading is too "high" the operator may back-off nut 36 on set screw 34 of adjustment means 31 and torque down the set screw to compress and pinch-down that end of flexure 17 to narrow cut out 38'.

The shank of the set screw is thus placed in tension between a head 39 of the set screw (FIG. 5) and threads 35. Nut 36 is then torqued-down and solely functions as a lock nut. The weight is moved to various positions along axis X—X (FIG. 2) on platter 11 with the appropriate adjustment being made to make certain that all readouts fall within the prescribed limits.

Should the readout fall below a required minimum, set screw 36 would be backed-off or loosened on threads 35 and nut 36, now functioning as a jam nut, would be torqued-down against the inner surface of flexure 17. Compression of the nut against the inner surface of that end of the flexure will function to spread the flexure away from base member 14 and slightly widen cutout 38'. The shank of the screw, between threads 35 and nut 36, will be placed in compression.

It should be noted that since the vertical center line of adjustment means 31 is located precisely on, the center line or longitudinal axis X—X of the transducer that only a single adjustment means is required for calibrating the moment along such axis. Flexure 17 may be considered in a broad sense to form a hinge connection at its point of securance on base member 14. Adjustment means 31 will thus function selectively to redistribute stresses in flexure 17 to provide at least substantially the same electrical signal from strain gages 23, independent of the location of weight W along axis X—X.

Thereafter, adjustment means 32 and 33 are adjusted simultaneously to further calibrate the load cell to provide the same readout, within manufacturing specifications, independent of the location of weight W along axis Y—Y (FIG. 2). It should be noted in FIG. 3 that the vertically disposed center lines of adjustment means 32 and 33 are aligned longitudinally but are offset laterally relative to longitudinal axis X—X of the load cell. As described above, slot 38 (FIG. 5) of each adjustment means 32 and 33 is closed one one side by a web 40 whereby only side-to-side moment adjustment of the load cell in the direction of axis Y—Y will be effected.

The operator will adjust set screws 34 and/or nuts of adjustment means 32 and 33 simultaneously to either slightly close or open respective cutouts 38 to thus artificially redistribute the stresses in flexure 18. Adjustment of adjustment means 32 and 33 will have no adverse effect on the prior calibration of adjustment means 31. Adjustment means 32 and 33 are each adjusted in the same manner described above in connection with the adjustment of adjustment means 31.

In particular, the shank of each set screw 39 of the latter two adjustment means will be either placed in tension between each head 39 and interengaging screw threads 35 (FIG. 5) when the set screws are torqued-down to pinch-in the respective ends of flexure 18 to slightly narrow cutouts 38 the same amount. Alternatively, the shanks of the set screws are placed in compression between nut 36 and interengaging screw threads 35 when only the nut is torqued-down to spread-out the flexure away from base member 14 to slightly widen each cutout 38.

Artificial flexing of flexure 18 in this manner will function to selectively redistribute stresses therein to compensate for positioning of weight W at any location in the direction of axis Y—Y (FIG. 2). After adjustment 32 and 33 have been set, adjustment means 31 can be rechecked to make certain that it has not been adversely affected thereby. If it has, adjustment means 31 can be readjusted in the manner described above to bring the X—X moment adjustment again into comformance with the prescribed manufacturer's specifications.

It should be understood that in certain weighing applications that adjustment means 31, 32 and 33 can be eliminated from a particular load cell embodiment. For example, such an application might involve the precise positioning or "point loading" of each weight W, during a sequence of weighing operations, over a center C (FIG. 2) of load receiving member 12. Since no offset loading on platter 11 is contemplated, no moments will occur in the system and thus the X—X and Y—Y adjustments described above would not be needed. However, load protection means 25 could still be employed in the load cell to protect it against possible damage.

In certain other weighing applications it may prove desireable to eliminate load protection means 25 entirely and solely use moment adjustments means 31-33. Other applications may require only the use of adjustment means 31 of adjustment means 32, 33, with or without load protection means 25. However, most of the commercial applications now under consideration would desireably utilize both of the above-described and illustrated load protection and moment adjustment means.

Various refinements can be made to the load cell, including modification to load protection means 25 and moment adjustment means 31-33, as will be appreciate by those skilled in the art. For example, flexure connection 20 could be made "stiffer" then flexure connection 19 by forming it to be slightly thicker than flexure connection 19. This condition of flexure 17 would ensure that only a torquing-down of set screw 34 of adjustment means 31 would be required to precisely calibrate the load cell for the X—X moment adjustment, i.e., the "jamming" function of nut 36 would not be required.

It should be noted that stop member 26 is relatively massive and will further function to dampen the load cell to minimize adverse resonant frequencies normally encountered during the course of weighing operations. The latter desiderata is particularly important in "fast weighing" applications where the items to be weighed are continuously in motion.

I claim:

1. A load cell comprising
   a base member adapted for securance to a stationary base,
   a load receiving member spaced apart from said base member and adapted to have a load imposed thereon,
   flexure means secured between said base and said load receiving members for flexing in response to said load, said flexure means comprising first and second flexures spaced apart in parallel relationship relative to each other and secured between said base and load receiving members to form a parallelogram therewith,
   sensing means for producing a variable signal in response to the magnitude of said load, and
   load protection means for delimiting flexing of said load receiving member and said flexure means in a first direction when the load imposed on said load receiving member exceeds a predetermined maximum, said load protection means comprising a stop member secured in cantilevered relationship on said first flexure and disposed between said base and load receiving members and stop means adjustably mounted on said base member for engaging said stop member when the load imposed on said load receiving member exceeds said predetermined maximum.

2. The load cell of claim 1 wherein said load protection means further delimits flexing of said load receiving member and said flexure means in a second direction, opposite to said first direction, when a second load imposed on said load receiving member exceeds a second predetermined maximum.

3. The load cell of claim 1 wherein said stop means comprises a set screw threadably mounted in said base member and having an end thereof positioned closely adjacent to said stop member to define a clearance therebetween.

4. The load cell of claim 1 wherein said base and load receiving members and said flexures are all formed from a unitary block of material and wherein each of said first and second flexures comprises a pair of longitudinally spaced flexure connections each formed by at least one arcuate cutout, said sensing means comprising at least one strain gage secured on said first flexure between the flexure connections thereof.

5. The load cell of claim 4 wherein a first flexure connection of said first flexure is vertically aligned with a first flexure connection of said second flexure and a second flexure connection of said first flexure is vertically aligned with a second flexure connection of said second flexure.

6. The load cell of claim 1 wherein said load protection means further delimits flexing of said load receiving member and said first and second flexures in a second direction, opposite to said first direction, when a second load imposed on said load receiving member exceeds a second predetermined maximum.

7. The load cell of claim 6 wherein said stop means comprises a set screw threadably mounted in said base member and having an end thereof positioned closely adjacent to said stop member to define a clearance therebetween and wherein said load protection means further comprises a second stop means adjustably mounted on said load receiving member for engaging said stop member when said second load exceeds said second predetermined maximum.

8. The load cell of claim 7 wherein said second stop means comprises a second set screw threadably mounted in said load receiving member and having an end thereof positioned closely adjacent to said stop member to define a clearance therebetween.

9. A load cell comprising
a base member adapted for securance to a stationary base,
a load receiving member spaced apart from said base member and adapted to have a load imposed thereon
flexure means secured between said base and load receiving members for flexing in response to said load,
sensing means for producing a signal in response to stresses sensed thereby due to the magnitude of said load,
adjustment means for selectively redistributing said stresses to provide at least substantially the same said signal independent of the location of said load on said load receiving member, said flexure means comprising at least one flexure secured between said base and load receiving members and wherein said adjustment means comprises first adjustment means interconnected between said flexure and at least one of said base and load receiving members for selectively moving said flexure relative thereto, said first adjustment means comprising a cutout defined between said flexure and said one member, a set screw sequentially extending through said first flexure in unattached relationship therewith and through said cutout into threaded engagement in said one member, a head of said set screw being disposed on an outer side of said flexure.

10. The load cell of claim 9 wherein said first adjustment means further comprises a nut threadably mounted on said set screw and disposed within said cutout for selective bearing engagement with an inner surface of said first flexure whereby torquing-down of said set screw to engage said head with the outer surface of said flexure will place a shank portion of said set screw in tension and torquing-down of said nut on said set screw and into bearing engagement with the inner surface of said flexure will place a shank portion of said shank portion in compression.

11. The load cell of claim 9 wherein said sensing means comprises at least one strain gage secured on said flexure.

12. The load cell of claim 9 wherein said flexure means further comprises a second flexure spaced apart in parallel relationship relative to said first-mentioned flexure and secured between said base and load receiving members to form a parallelogram therewith and wherein said first adjustment means is interconnected between said first-mentioned flexure and said base member for selectively redistributing stresses in said first-mentioned flexure and said adjustment means further comprises second adjustment means interconnected between said second flexure and each of said base and load receiving members for selectively redistributing stresses in said second flexure.

13. The load cell of claim 12 wherein said second adjustment means comprises a first cutout defined between a first end of said second flexure and said base member, a second cutout defined between a second end of said second flexure and said load receiving member and first and second set screws extending in unattached relationship through each of the first and second ends of said second flexure, respectively, and threadably attached to a respective one of said base and load receiving members.

14. The load cell of claim 13 wherein each said set screw comprises a head mounted on an outer side of said second flexure and a nut threadably mounted on each said set screw and disposed within a respective one of said first and second cutouts to engage an innersurface of said flexure in bearing relationship therewith.

15. The load cell of claim 14 wherein said first adjustment means comprises a third cutout defined between an end of said first-mentioned flexure and said base member, a third set screw extending in unattached relationship through said first mentioned flexure and threadably attached to said base member and a nut threadably mounted on said set screw and disposed within said cutout, a head of said third set screw disposed on an outer side of said first-mentioned flexure.

16. A load cell comprising
a base member adapted to securance to a stationary base,
a load receiving member spaced apart from said base member and adapted to have a load imposed thereon,
flexure means secured between said base and load receiving members for flexing in response to said load, said flexure means comprising first and second flexures spaced apart in parallel relationship relative to each other and secured between said base and load receiving members to form a parallelogram therewith,
sensing means for producing a signal in response to stresses sensed thereby due to the magnitude of said load, and
adjustment means for selectively redistributing said stresses to provide at least substantially the same said signal independent of the location of said load on said load receiving member, said adjustment means comprising first adjustment means interconnected between said first flexure and said base member for selectively moving said first flexure relative to said base member to redistribute stresses in said first flexure and second adjustment means interconnected between said second flexure and each of said base and load receiving members for selectively redistributing stresses in said second flexure.

* * * * *